(12) United States Patent
Blank et al.

(10) Patent No.: US 12,286,057 B2
(45) Date of Patent: *Apr. 29, 2025

(54) VEHICULAR VIDEO MIRROR SYSTEM UTILIZING A TRAILER CAMERA

(71) Applicant: Magna Mirrors of America, Inc., Holland, MI (US)

(72) Inventors: Rodney K. Blank, Zeeland, MI (US); Christopher R. Koetje, Zeeland, MI (US); Patrick M. Foley, IV, Nunica, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/633,592

(22) Filed: Apr. 12, 2024

(65) Prior Publication Data

US 2024/0253563 A1    Aug. 1, 2024

Related U.S. Application Data

(63) Continuation of application No. 17/662,335, filed on May 6, 2022, now Pat. No. 11,958,414, which is a
(Continued)

(51) Int. Cl.
*B60R 1/12*    (2006.01)
*B60R 1/00*    (2022.01)
(Continued)

(52) U.S. Cl.
CPC ............... *B60R 1/12* (2013.01); *B60R 1/002* (2013.01); *B60R 1/04* (2013.01); *B60R 1/26* (2022.01);
(Continued)

(58) Field of Classification Search
CPC .. B60R 1/12; B60R 1/002; B60R 1/04; B60R 1/26; B60R 2001/1253; B60R 2300/105;
(Continued)

(56) References Cited

U.S. PATENT DOCUMENTS 2,263,382 A   11/1941  Gotzinger
2,580,014 A   12/1951  Gazda
(Continued)

*Primary Examiner* — Nasim N Nirjhar
(74) *Attorney, Agent, or Firm* — HONIGMAN LLP

(57) ABSTRACT

A vehicular video mirror system includes a display device having a video display screen accommodated by a mirror head of an interior rearview mirror assembly. The vehicular video mirror system is operable in a mirror mode or a display mode. A vehicle-mounted rearward-viewing digital camera is disposed at the vehicle and a trailer-mounted rearward-viewing analog camera is disposed at a trailer that is configured to be hitched to the vehicle. With no trailer hitched to the vehicle, and when the vehicular video mirror system operates in the display mode, the video display screen displays video images derived from image data captured by the vehicle-mounted rearward-viewing camera. With the trailer hitched to the vehicle, and when the vehicular video mirror system operates in the display mode, the video display screen displays rearward-view video images derived from image data captured by the trailer-mounted rearward-viewing camera.

45 Claims, 13 Drawing Sheets

Related U.S. Application Data continuation of application No. 16/170,075, filed on Oct. 25, 2018, now abandoned.

(60) Provisional application No. 62/584,304, filed on Nov. 10, 2017, provisional application No. 62/576,776, filed on Oct. 25, 2017.

(51) Int. Cl.
  *B60R 1/04* (2006.01)
  *B60R 1/26* (2022.01)
  *H04N 7/18* (2006.01)

(52) U.S. Cl.
  CPC ............. *H04N 7/181* (2013.01); *H04N 7/183* (2013.01); *B60R 2001/1253* (2013.01); *B60R 2300/105* (2013.01); *B60R 2300/8046* (2013.01); *B60R 2300/8066* (2013.01)

(58) Field of Classification Search
  CPC .... B60R 2300/8046; B60R 2300/8066; H04N 7/181; H04N 7/183
  See application file for complete search history.

(56) References Cited

U.S. PATENT DOCUMENTS

| | | |
|---|---|---|
| 3,266,016 A | 8/1966 | Maru |
| 4,499,451 A | 2/1985 | Suzuki et al. |
| 4,588,267 A | 5/1986 | Pastore |
| 4,623,222 A | 11/1986 | Itoh et al. |
| 4,630,904 A | 12/1986 | Pastore |
| 4,721,364 A | 1/1988 | Itoh et al. |
| 4,906,085 A | 3/1990 | Sugihara et al. |
| 5,313,335 A | 5/1994 | Gray et al. |
| 5,355,284 A | 10/1994 | Roberts |
| 5,436,741 A | 7/1995 | Crandall |
| 5,481,409 A | 1/1996 | Roberts |
| 5,530,240 A | 6/1996 | Larson et al. |
| 5,575,552 A | 11/1996 | Faloon et al. |
| 5,587,699 A | 12/1996 | Faloon et al. |
| 5,668,663 A | 9/1997 | Varaprasad et al. |
| 5,724,187 A | 3/1998 | Varaprasad et al. |
| 5,786,772 A | 7/1998 | Schofield et al. |
| 5,788,357 A | 8/1998 | Muth et al. |
| 5,938,320 A | 8/1999 | Crandall |
| 6,005,724 A | 12/1999 | Todd |
| 6,045,243 A | 4/2000 | Muth et al. |
| 6,111,683 A | 8/2000 | Cammenga et al. |
| 6,257,746 B1 | 7/2001 | Todd et al. |
| 6,264,353 B1 | 7/2001 | Caraher et al. |
| 6,329,925 B1 | 12/2001 | Skiver et al. |
| 6,356,376 B1 | 3/2002 | Tonar et al. |
| 6,512,624 B2 | 1/2003 | Tonar et al. |
| 6,690,268 B2 | 2/2004 | Schofield et al. |
| 6,700,692 B2 | 3/2004 | Tonar et al. |
| 7,184,190 B2 | 2/2007 | McCabe et al. |
| 7,195,381 B2 | 3/2007 | Lynam et al. |
| 7,224,324 B2 | 5/2007 | Quist et al. |
| 7,253,723 B2 | 8/2007 | Lindahl et al. |
| 7,255,451 B2 | 8/2007 | McCabe et al. |
| 7,274,501 B2 | 9/2007 | McCabe et al. |
| 7,338,177 B2 | 3/2008 | Lynam |
| 7,370,983 B2 | 5/2008 | DeWind et al. |
| 7,446,650 B2 | 11/2008 | Scholfield et al. |
| 7,446,924 B2 | 11/2008 | Schofield et al. |
| 7,581,859 B2 | 9/2009 | Lynam |
| 7,626,749 B2 | 12/2009 | Baur et al. |
| 7,777,611 B2 | 8/2010 | Desai |
| 7,855,755 B2 | 12/2010 | Weller et al. |
| 8,154,418 B2 | 4/2012 | Peterson et al. |
| 8,508,831 B2 | 8/2013 | De Wind et al. |
| 8,730,553 B2 | 5/2014 | De Wind et al. |
| 9,346,403 B2 | 5/2016 | Uken et al. |
| 9,487,142 B2 | 11/2016 | Sobecki et al. |
| 9,565,419 B2* | 2/2017 | Presler ............... H04N 13/257 |
| 9,598,016 B2 | 3/2017 | Blank et al. |
| 9,676,336 B2 | 6/2017 | Peterson et al. |
| 9,827,913 B2 | 11/2017 | De Wind et al. |
| 11,958,414 B2 | 4/2024 | Blank et al. |
| 2006/0050018 A1 | 3/2006 | Hutzel et al. |
| 2012/0154591 A1 | 6/2012 | Baur et al. |
| 2013/0107045 A1* | 5/2013 | Soderlind ................ B60R 1/04 348/148 |
| 2013/0177303 A1* | 7/2013 | Pierce ............. G08B 13/19632 396/427 |
| 2014/0285666 A1 | 9/2014 | O'Connell et al. |
| 2016/0288714 A1 | 10/2016 | Fuji et al. |
| 2016/0375833 A1 | 12/2016 | Larson et al. |
| 2017/0267179 A1 | 9/2017 | Herrmann et al. |
| 2017/0297498 A1 | 10/2017 | Larson et al. |
| 2017/0327044 A1 | 11/2017 | Baur |
| 2017/0355312 A1 | 12/2017 | Habibi et al. |
| 2018/0065482 A1 | 3/2018 | Yagyu et al. |
| 2018/0093613 A1* | 4/2018 | Timoneda ............... H04N 7/181 |
| 2018/0134217 A1 | 5/2018 | Peterson et al. |
| 2018/0251069 A1 | 9/2018 | LaCross et al. |
| 2019/0118717 A1 | 4/2019 | Blank et al. |
| 2019/0146297 A1 | 5/2019 | Lynam et al. |

\* cited by examiner

VEHICULAR VIDEO MIRROR SYSTEM UTILIZING A TRAILER CAMERA

CROSS REFERENCE TO RELATED APPLICATIONS

The present application is a continuation of U.S. patent application Ser. No. 17/662,335, filed May 6, 2022, now U.S. Pat. No. 11,958,414, which is a continuation of U.S. patent application Ser. No. 16/170,075, filed Oct. 25, 2018, which claims the filing benefits of U.S. provisional application Ser. No. 62/584,304, filed Nov. 10, 2017, and U.S. provisional application Ser. No. 62/576,776, filed Oct. 25, 2017, which are hereby incorporated herein by reference in their entireties.

FIELD OF THE INVENTION

The present invention relates to interior rearview mirror systems and, more particularly, to an interior rearview mirror system having a display at the interior rearview mirror for viewing by the driver of the vehicle.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element. It is also generally known to provide a display screen at the mirror assembly. A variety of interior and exterior mirror assemblies with indicators and/or displays are known in the art, such as U.S. Pat. Nos. 5,668,663; 5,355,284; 5,788,357; 6,257,746; 6,005,724; 5,481,409; 6,111,683; 6,045,243; 6,264,353; 6,512,624; 6,356,376; 2,263,382; 2,580,014; 3,266,016; 4,499,451; 4,588,267; 4,630,904; 4,623,222; 4,721,364; 4,906,085; 5,313,335; 5,587,699; 5,575,552; 5,436,741; 5,587,699; 5,938,320; 6,700,692 and 5,786,772, which are all hereby incorporated herein by reference in their entireties.

SUMMARY OF THE INVENTION

The present invention provides a vision system for displaying video images of captured images for viewing by the driver of the vehicle. A video display screen is disposed in the vehicle cabin and is viewable at the interior rearview mirror assembly. The display screen, when actuated, displays video images derived from image data captured by a selected one of a vehicle mounted rearward viewing camera that has a field of view rearward of the vehicle, and a trailer mounted rearward viewing camera that has a field of view rearward of a trailer being towed by the vehicle. The displayed images comprise video images that correspond to an unobstructed rearward view similar to the field of view provided by the reflective element when in a mirror mode. The trailer mounted rearward viewing camera comprises a high definition analog camera having a resolution of at least one million pixels.

Optionally, the trailer mounted rearward viewing camera may comprise a high definition analog camera having a resolution of at least two million pixels. Optionally, the vehicle mounted rearward viewing camera may comprise a digital camera. Optionally, the display device may comprise a video display screen that, responsive to determination of the connection of a trailer with the trailer mounted rearward viewing camera, displays video images derived from image data captured by the trailer mounted rearward viewing camera.

These and other objects, advantages, purposes and features of the present invention will become apparent upon review of the following specification in conjunction with the drawings.

DESCRIPTION OF THE PREFERRED EMBODIMENTS

Figure 1:
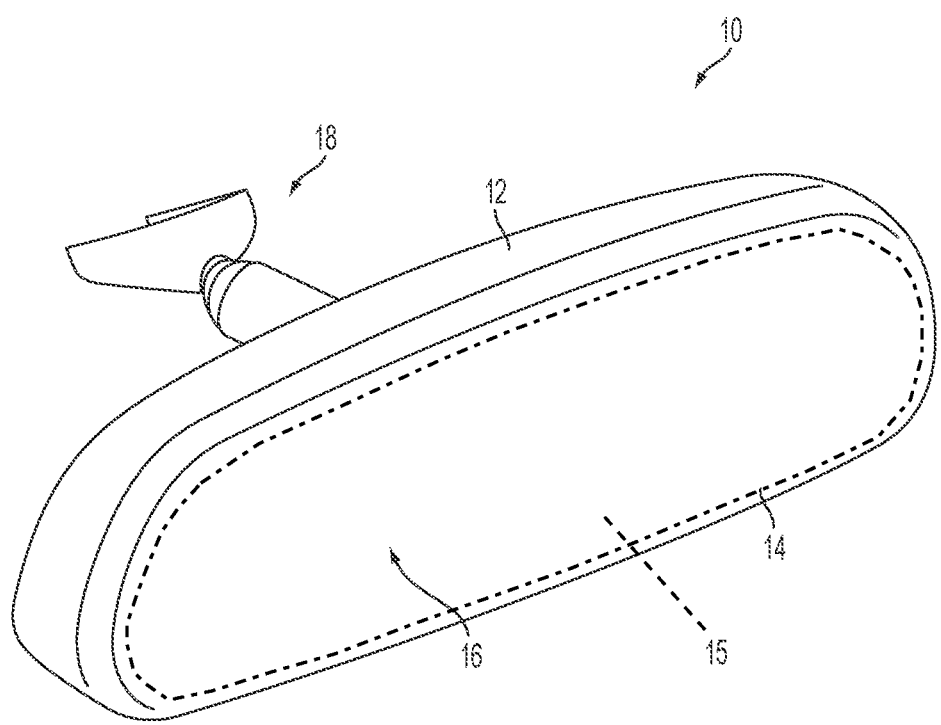
FIG. 1 is a perspective view of an interior rearview mirror assembly suitable for use with the display system of the present invention.

Referring now to the drawings and the illustrative embodiments depicted therein, an interior rearview mirror assembly 10 for a vehicle includes a casing 12 that houses a reflective element 14 and a display device, which provides a display area 16 visible to the driver of the vehicle through the reflective element 14 (FIG. 1). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 18. The casing 12 of the interior rearview mirror assembly 10 may house all or a portion of the components of the interior rearview mirror assembly 10 and may be integrally formed with portions thereof.

The mirror head is tiltable or pivotable between a mirror mode orientation, where the reflective element is positioned to provide the desired driver's rearward field of view, and a display mode orientation, where the mirror head is tilted upward or downward relative to the mirror mode orientation, such that the display is viewable by the driver while the reflective element reflects light from rearward of the vehicle and incident thereon upward or downward away from the driver's eyes. The mirror head includes a full mirror display screen 15 and may be tiltable or pivotable between the mirror mode orientation and the display mode orientation via an actuator that is electrically powered to impart a pivotal movement or flipping of the mirror head about a generally horizontal pivot axis, such as by utilizing aspects of the mirror systems described in U.S. Publication Nos. US-2018-0251069; US-2017-0355312; US-2017-0297498 and/or US-2016-0375833, which are hereby incorporated herein by reference in their entireties. The interior mirror thus can be used as a traditional mirror assembly, but can also be changed to a video monitor, such as through a use of a transflective surface and a high intensity display transposed behind the transflective surface.

The present invention provides a display system that can display video images across the entire reflective surface or active reflective area (or substantially the entire reflective surface or active reflective area) of an interior rearview mirror assembly. The display system includes a display device disposed at an upper region of the vehicle's interior cabin (or other location), such that, when the mirror head is tilted or angled or otherwise mechanically adjusted, the mirror reflective element reflects the displayed image across the entire reflective surface for viewing by the driver of the vehicle. For example, when the mirror head is adjusted or the display device is not actuated (so that the mirror functions in a "mirror mode"), the driver can view the rearward field of view provided by the reflective element, but when the mirror head is tilted or adjusted and/or when the display device is actuated (so that the mirror functions in a "display mode"), the displayed video images (such as derived from image data captured by a rearward viewing camera) are viewable by the driver of the vehicle, with the tilting of the mirror head causing the primary reflection off of the reflective element to be out of the driver's eyes (since it would be aimed up toward the headliner or down into the cabin area instead of out the rear window).

The display screen preferably displays the captured video images at the entire viewable portion of the display screen, in order to provide relatively large displayed images for viewing by the driver of the vehicle while the driver is normally operating the vehicle. In the illustrated embodiment, the user inputs are touch or proximity sensors disposed at a portion of the display screen. The video display screen, when normally operating to display video images captured by the camera, may display the video images over the entire display portion or active portion of the display screen and, responsive to a user input (such as a user or driver touching a portion of the display screen or touch screen), may display icons or indicia at a portion of the display screen to indicate where the user can touch to actuate or control the display settings or the like. The user inputs or touch sensors may comprise any suitable sensors or inputs, and may utilize aspects of the inputs and sensors described in U.S. Pat. Nos. 7,224,324; 7,253,723; 7,255,451 and/or 8,154,418, and/or International Publication Nos. WO 2012/051500; WO 2010/124064; WO 2011/044312; WO 2013/071070 and/or WO 2013/126719, which are hereby incorporated herein by reference in their entireties.

Figure 2:
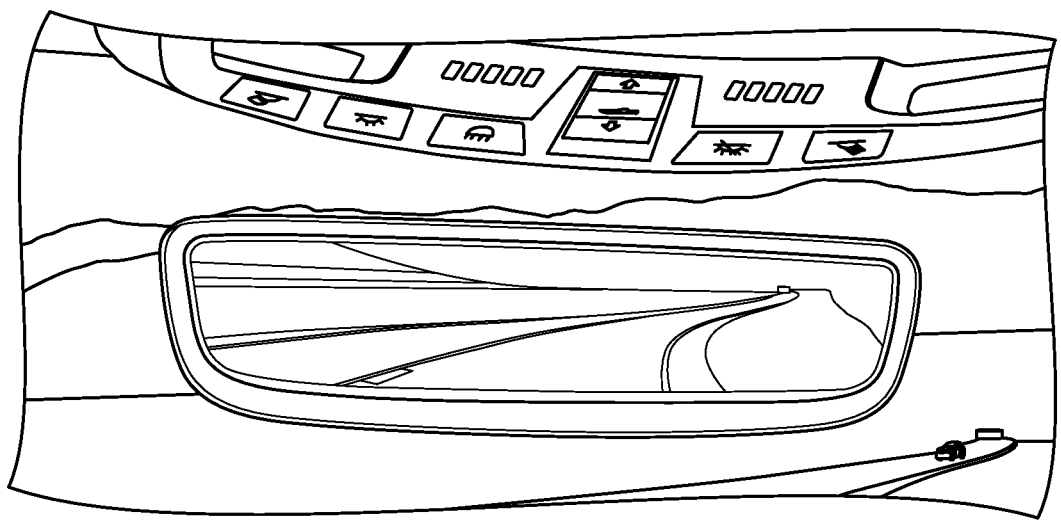
FIGS. 2-4 are views of mirror assemblies with full screen video displays and with optional user inputs.
Figure 3:
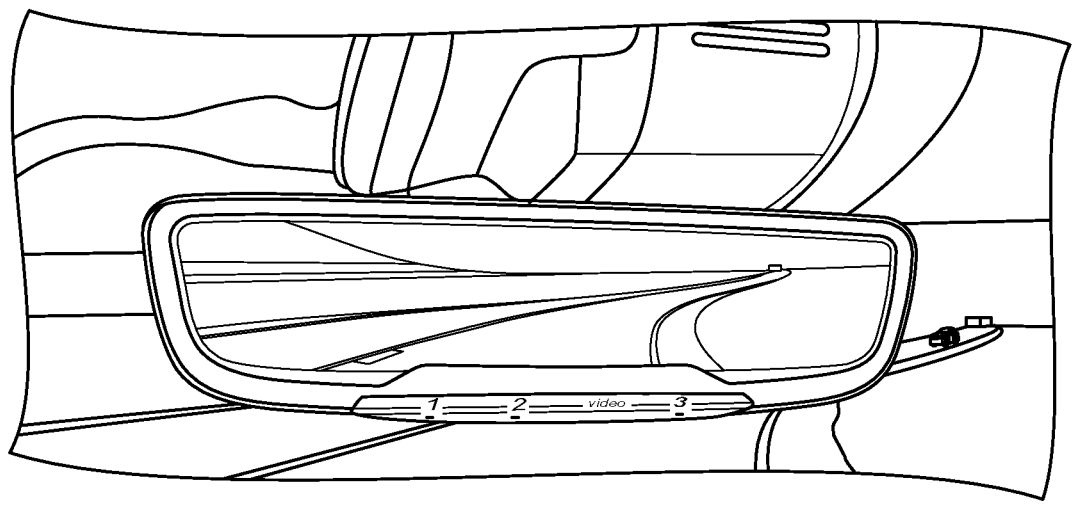
Figure 4:
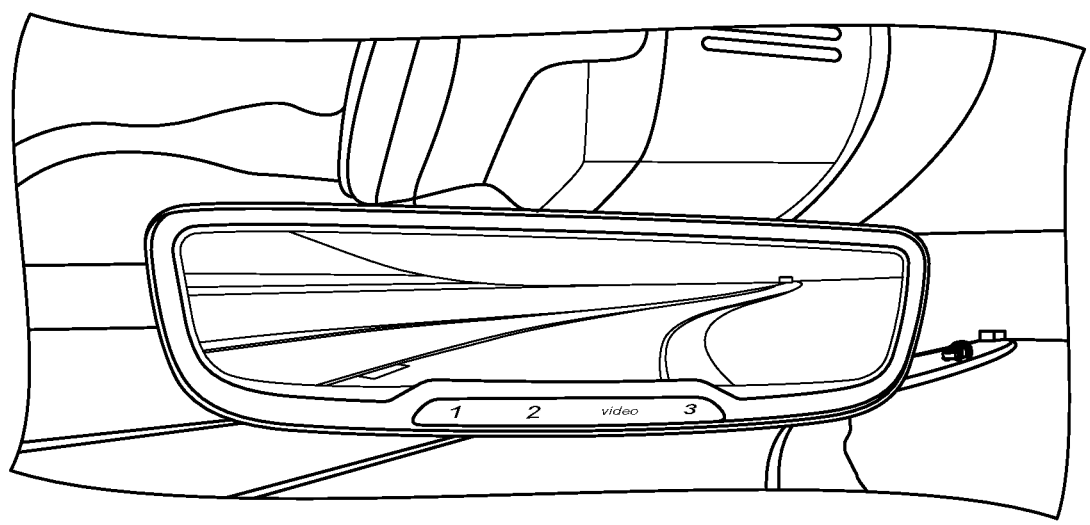

Optionally, for example, an interior rearview mirror assembly with a full screen display may not include any user inputs or buttons or sensors, such as shown in FIG. 2. Optionally, the interior mirror and display assembly may include touch sensors or buttons (such as capacitive touch sensors or buttons) disposed along a lower portion of the mirror bezel, such as shown in FIG. 3, or along a widened lower portion of the bezel (such as shown in FIG. 4). Optionally, a single touch sensor or button or user input may be provided at the mirror, and may be customized for the particular vehicle or application or the like.

Figure 5:
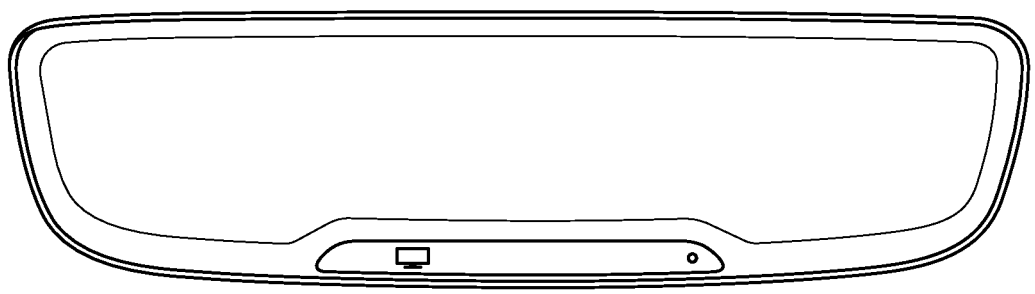
FIGS. 5 and 6 are plan views showing the mirror in its mirror mode (FIG. 5) and in its display mode (FIG. 6)
Figure 6:
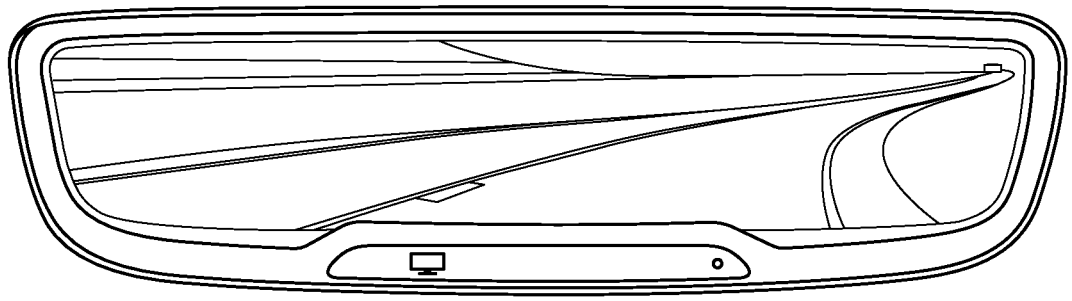

As shown in FIGS. 5 and 6, the mirror may function in a mirror mode (FIG. 5), where the display is deactivated and the driver views rearward via reflection at the mirror reflector of the reflective element, or the mirror may function in a display mode (FIG. 6), where the display is activated and the driver views the displayed images at the mirror reflective element. The changes between mirror mode and display mode may be responsive to a user input, and the mirror head may automatically pivot (via an actuator of the mirror assembly) to the appropriate orientation for the selected mode, such as described above.

Optionally, when the system determines that a trailer (having a trailer-mounted rearward viewing camera) is connected to the vehicle (such as via the system receiving an output from the trailer-mounted rearward viewing camera and/or a signal indicative of hitching of the trailer to a hitch of the vehicle, such as a signal indicative of a trailer wire harness (such as, for example, a four pin or five pin or seven pin trailer wire harness) connecting to a wire harness of the vehicle, or such as the display device receiving a communication from the trailer-mounted camera that is indicative of or representative of the trailer being hitched to the vehicle), the display system automatically switches to the display mode and displays video images derived from the image data captured by the trailer-mounted rearward viewing camera.

In such a situation, the switch to the display mode and display of video images may be automatic upon determination of the trailer hitching to the vehicle, or may be further responsive to when the vehicle shifts to a forward or reverse gear or begins to move in a forward or reverse direction (so that the driver sees, in the mirror, the view rearward of the trailer and does not see the trailer itself (as the driver would otherwise see if the system was in the mirror mode). If the vehicle shifts to a forward gear, the display may display video images derived from image data captured by the trailer-mounted rearward viewing camera at an upper region of the field of view of the trailer-mounted rearward viewing camera. And if the vehicle shifts to a reverse gear, the display may display video images derived from image data captured by the trailer-mounted rearward viewing camera at a lower region of the field of view of the trailer-mounted rearward viewing camera. Thus, the system automatically provides the appropriate video images for viewing by the driver of the vehicle to assist the driver during forward or reversing driving maneuvers. The system may be overridden via a user input, so that, even when a trailer (having the trailer-mounted camera) is hitched to the vehicle, the driver can select the mirror mode (such as via actuation of a user input or the like).

The mirror system may include an electronically operable actuator that is operable to adjust or pivot the mirror head between the mirror mode orientation and the display mode orientation. For example, the mirror actuator may move the mirror head to the display mode orientation responsive to a user input or responsive to the driver shifting the vehicle into a reverse gear, whereby a rear backup camera is actuated and the display displays video images derived from image data captured by the rear backup camera.

The actuator thus performs the rotation of the mirror head like a traditional manual flip-tab/toggle mechanism would. The actuator pivots the mirror head of a full-size-video display inside mirror so the mirror head can be used as an interior rearview mirror (mirror mode) or as a full mirror display screen (display mode). When the user hits a switch or button, the actuator tilts the mirror and the digital display turns on. The tilting action gets the primary reflection out of the driver's eyes as it would be aimed up into the headliner or down into the cabin area instead of out the rear window.

The display device is operable to display video images (such as derived from image data captured by one or more cameras of the vehicle, such as one or more cameras having rearward and/or sideward exterior fields of view and/or one or more cameras having interior fields of view in the cabin of the vehicle) when the mirror head is in its display mode orientation. The display device or module may utilize aspects of the modules described in International Publication No. WO 2016/178190 and/or U.S. Publication No. US-2014-0285666, which are all hereby incorporated herein by reference in their entireties.

Figure 7:
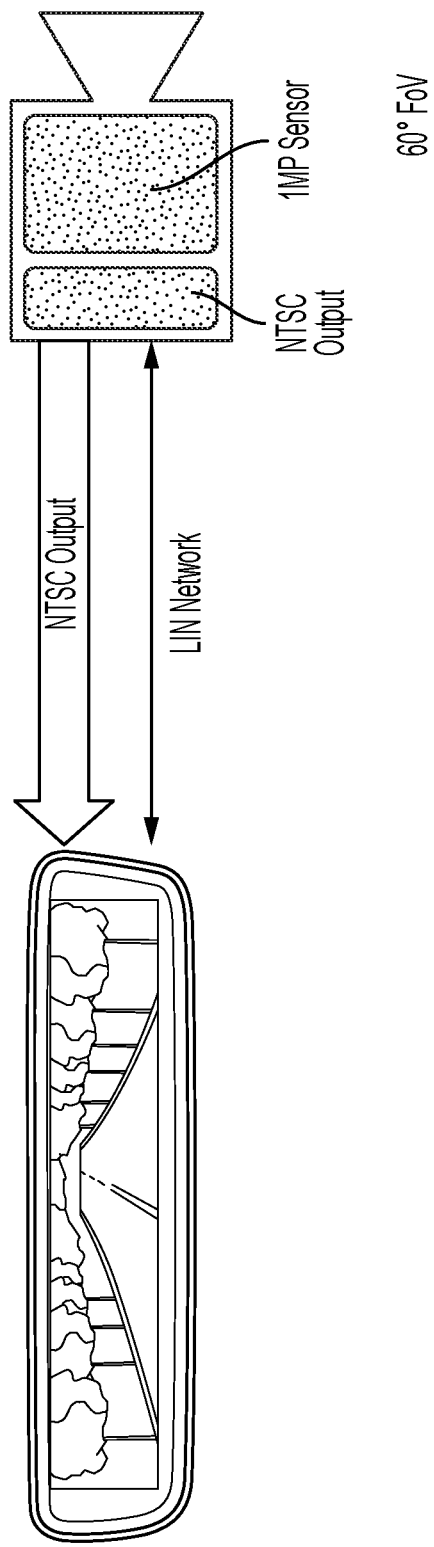
FIG. 7 is a schematic showing the mirror display in connection with an NTSC camera.
Figure 8:
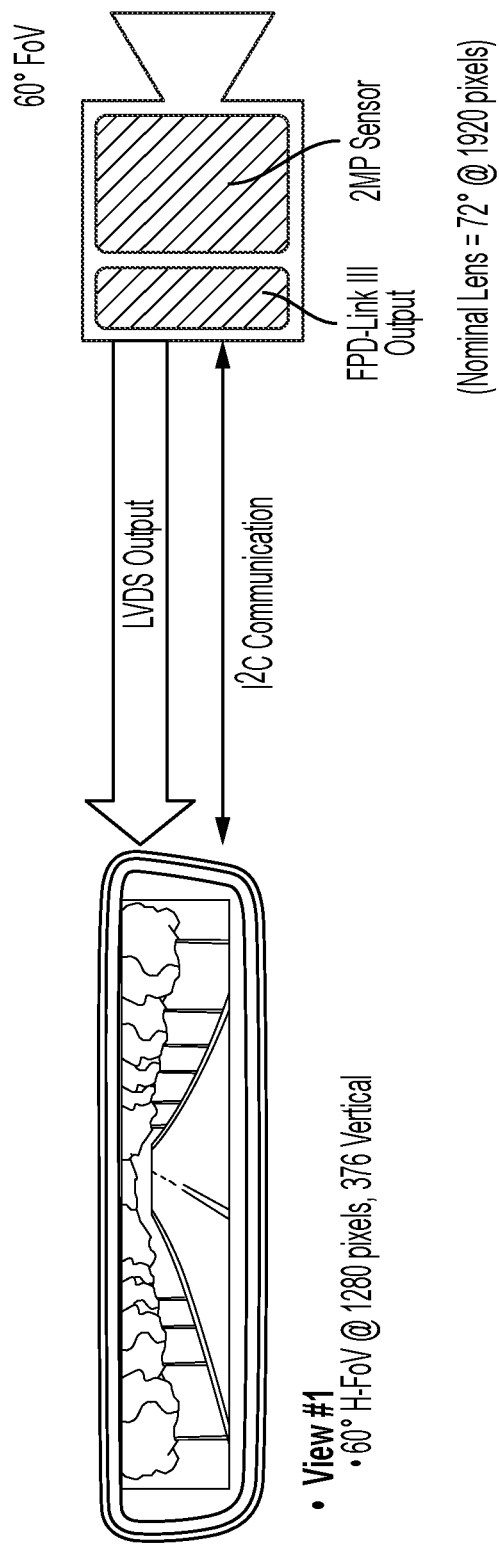
FIG. 8 is a schematic showing the mirror display in connection with a digital camera.

The displayed video images are derived from image data or images captured by one or more rearward viewing cameras. For example, the rearward viewing camera may comprise an analog or NTSC (National Television System Committee) camera that communicates with the mirror display (such as via a LIN network of the vehicle) and that provides an NTSC output to the mirror display, such as shown in FIG. 7. Optionally, the rearward viewing camera may comprise a digital camera (FIG. 8), which communicates with the mirror display (such as via an I²C control or communication) and which provides an LVDS (Low Voltage Differential Signal) output to the mirror display.

Figure 9:
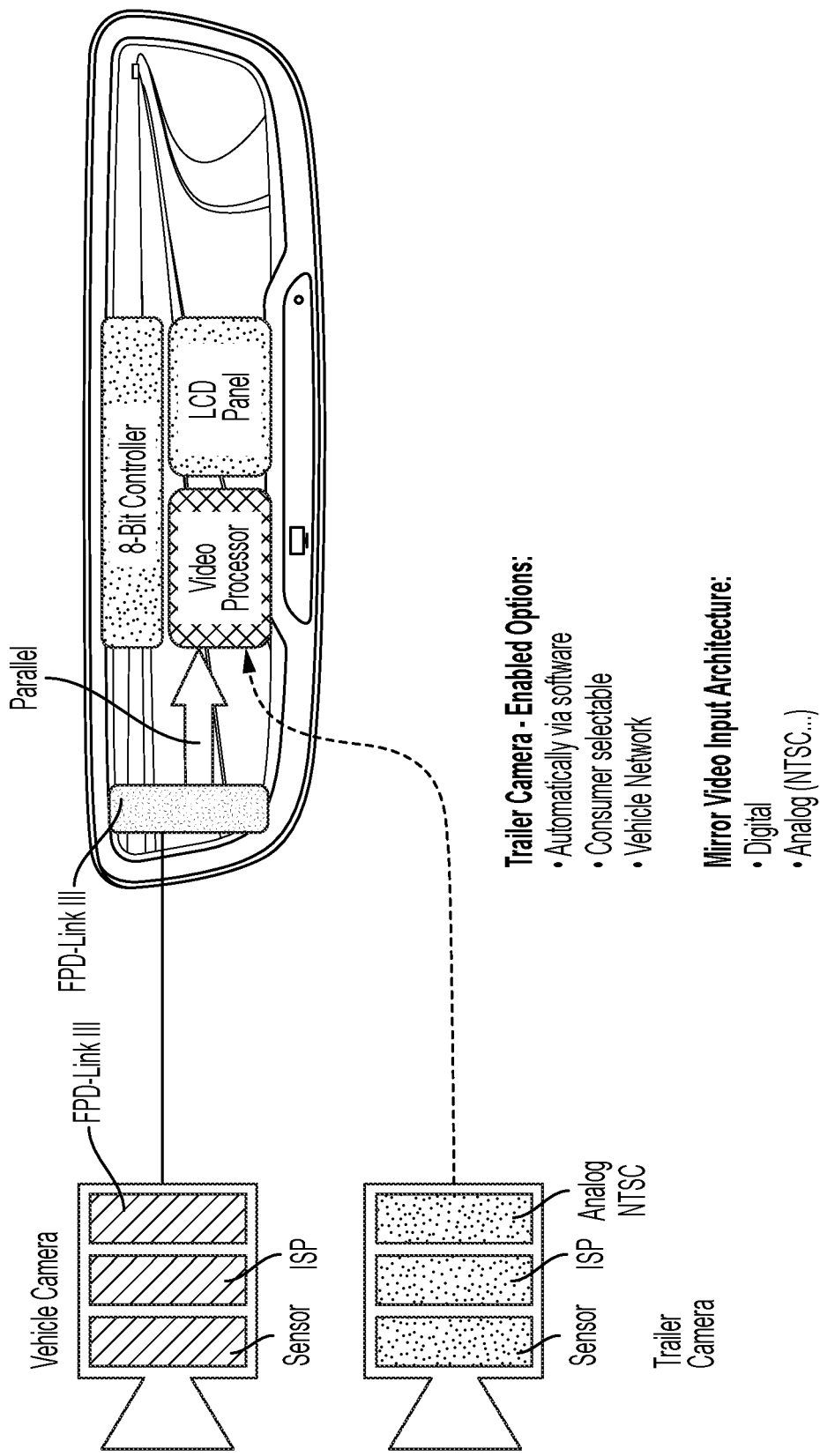
FIG. 9 is a schematic showing the mirror display in connection with a digital rear backup vehicle camera and an analog trailer camera.

Optionally, the display system may be operable to display video images derived from image data or images captured by a trailer-mounted rearward viewing camera, such that, when a trailer is being towed by the vehicle (and thus when the trailer is obstructing the driver's rearward field of view and the rearward field of view of a vehicle-mounted rearward viewing camera), the trailer-mounted rearward viewing camera (disposed at a rear portion of the trailer and viewing rearward therefrom) may be in communication with the mirror display, such that the mirror display can display video images derived from image data or images captured by the trailer camera to provide a rearward view to the driver of the vehicle. For example, and such as shown in FIG. 9, the display system may include a digital vehicle camera and an analog trailer camera.

The trailer camera may be automatically enabled or may be activated or enabled responsive to a user input or may be activated or enabled via a vehicle network or the like. The mirror display is operable to receive the digital input from the vehicle camera and the analog input from the trailer camera, and displays the respective video images responsive to the user selection or determination that the trailer camera is connected and/or enabled. For example, when no trailer is connected to the vehicle, the display system displays (when shifted to the display mode, such as via actuation of a user input or the like) video images derived from image data captured by the vehicle camera, but when a trailer is connected to the vehicle, the display system automatically switches to the display mode and to a trailer view and displays video images derived from the analog NTSC signal from the trailer camera.

Figure 10:
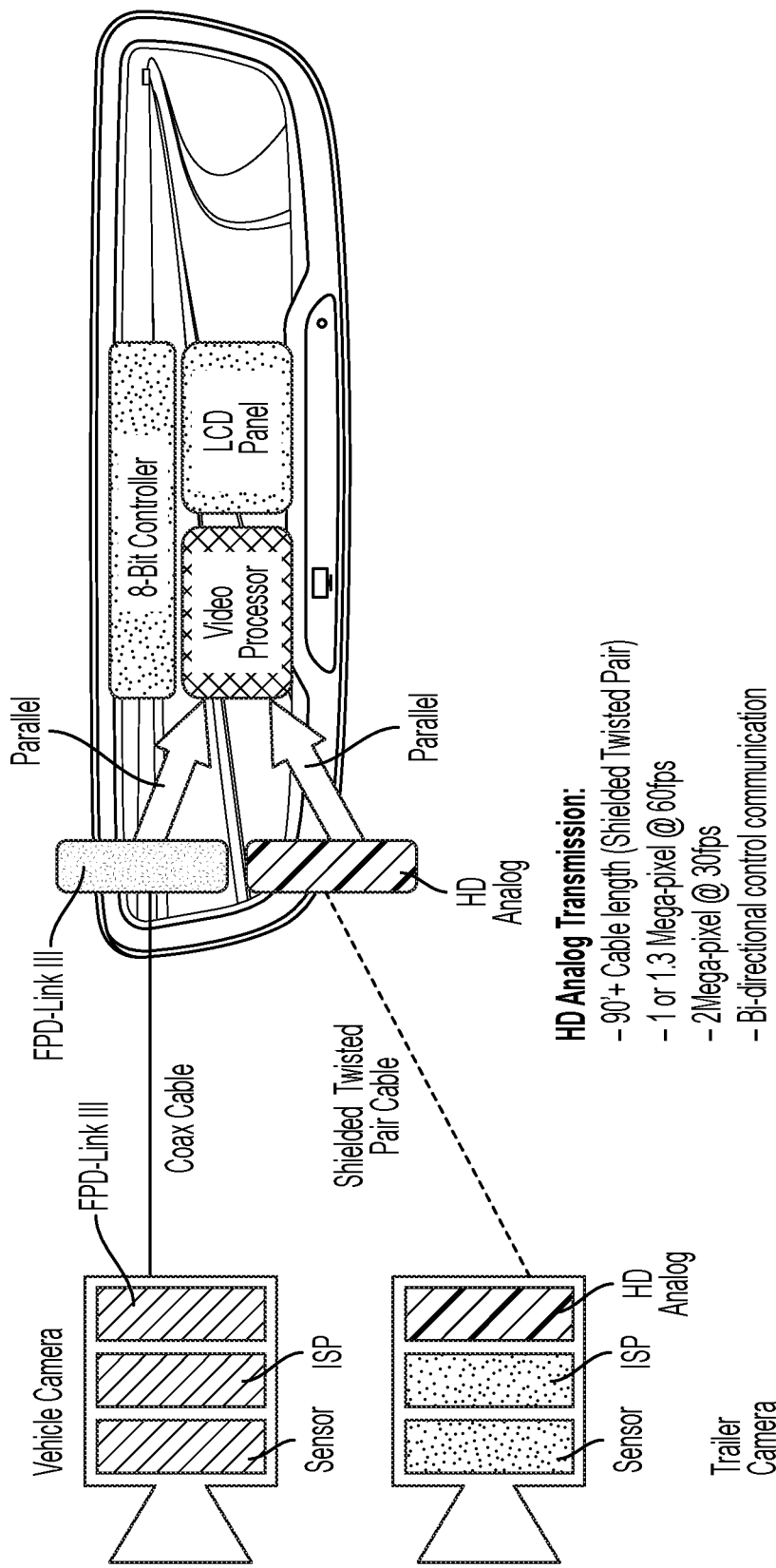
FIG. 10 is a schematic showing the mirror display in connection with a digital rear backup vehicle camera and an HD analog trailer camera.

Optionally, and desirably, the trailer camera comprises a high definition (HD) analog camera that outputs an HD analog signal to the mirror display, such as shown in FIG. 10. For example, the trailer camera may be in communication with the mirror display via a cable or wire harness (such as a shielded twisted pair cable or wire harness). The trailer camera may comprise a 1 Megapixel camera or a 1.3 Megapixel camera or a 2 Megapixel camera (or more), and may capture images at a frame rate of 60 frames per second (fps) or 30 fps, respectively.

Figure 11:
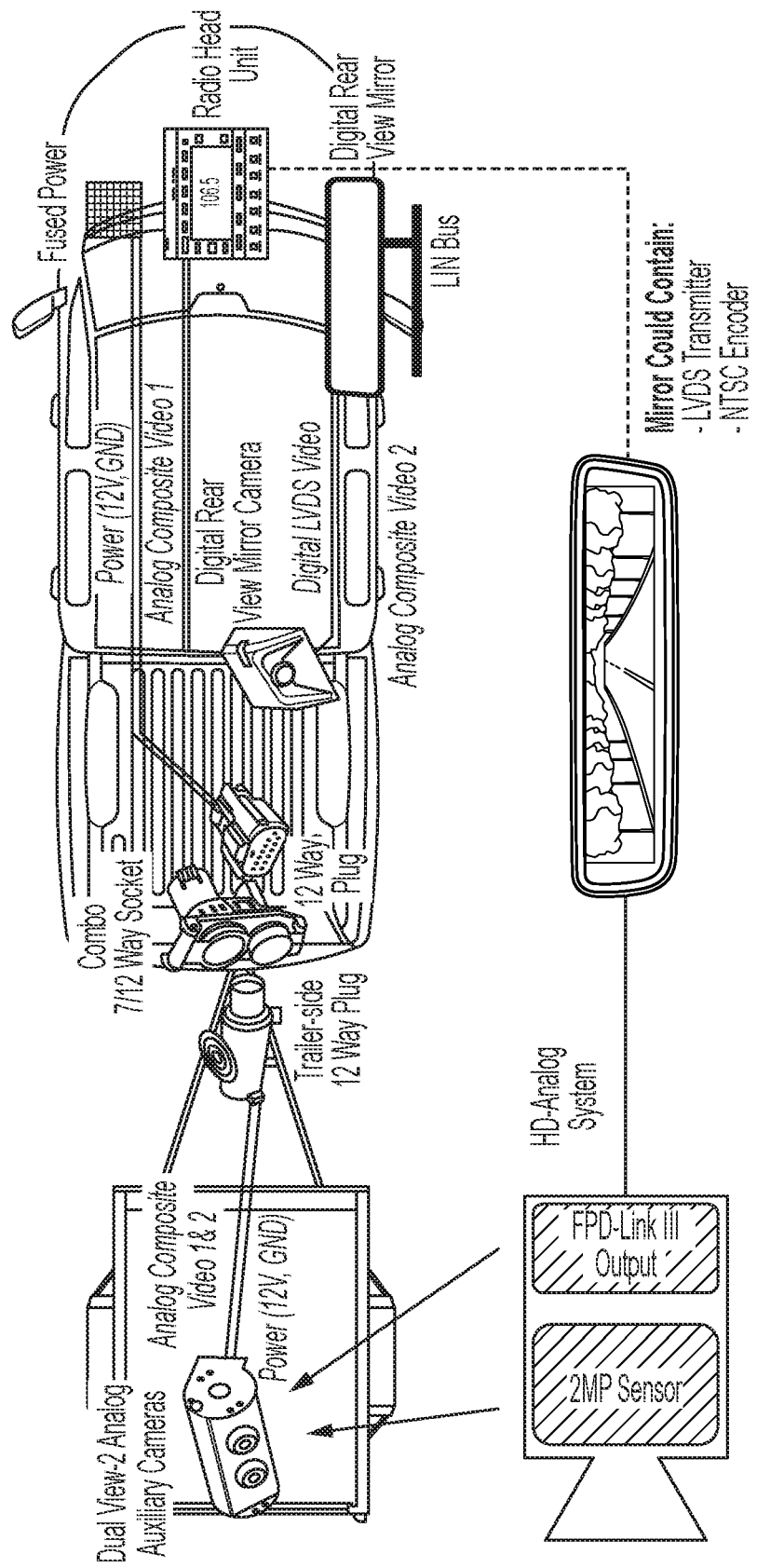
FIG. 11 is a schematic showing the mirror display in connection with a digital rear backup vehicle camera and HD analog trailer cameras.

Optionally, and such as shown in FIG. 11, the trailer may include two analog cameras that are connected to a wire or cable that connects to a socket or plug at the vehicle (when the trailer is hooked up to the vehicle). The socket or plug is electrically connected to the mirror display system, which also receives digital LVDS video signals from a digital vehicle camera.

Optionally, the system may automatically switch between which camera provides the image data for display and what type of image data or images is/are provided. For example, the two trailer cameras may comprise an analog camera and an HD analog camera. Since both NTSC and Analog-HD signals can use the same wiring (e.g., Shielded Twisted Pair), the mirror circuits working with software can determine which type of signal is being applied to the input terminals. Automatic detection can allow the same mirror to operate with either an NTSC or Analog-HD camera. The detection method may include measuring horizontal line timing, measuring vertical frame frequency, measuring signal amplitude, measuring R, G, B values of pixel colors at certain locations, measuring overall brightness or contrast of the captured image data, and/or measuring local areas for brightness or contrast.

Optionally, the system may provide an analog HD failsafe to NTSC configuration. Thus, in situations where the analog-HD transmission system experiences a failure, the camera could automatically change to an NTSC output, in order to allow the camera-display system to continue to operate at reduced performance. Such a configuration would require the mirror to communicate with the camera about the status of the received image data over analog-HD. When the mirror fails to respond to the camera, or confirms that the image data is not received, the camera can then change to its NTSC output format.

Figure 12:
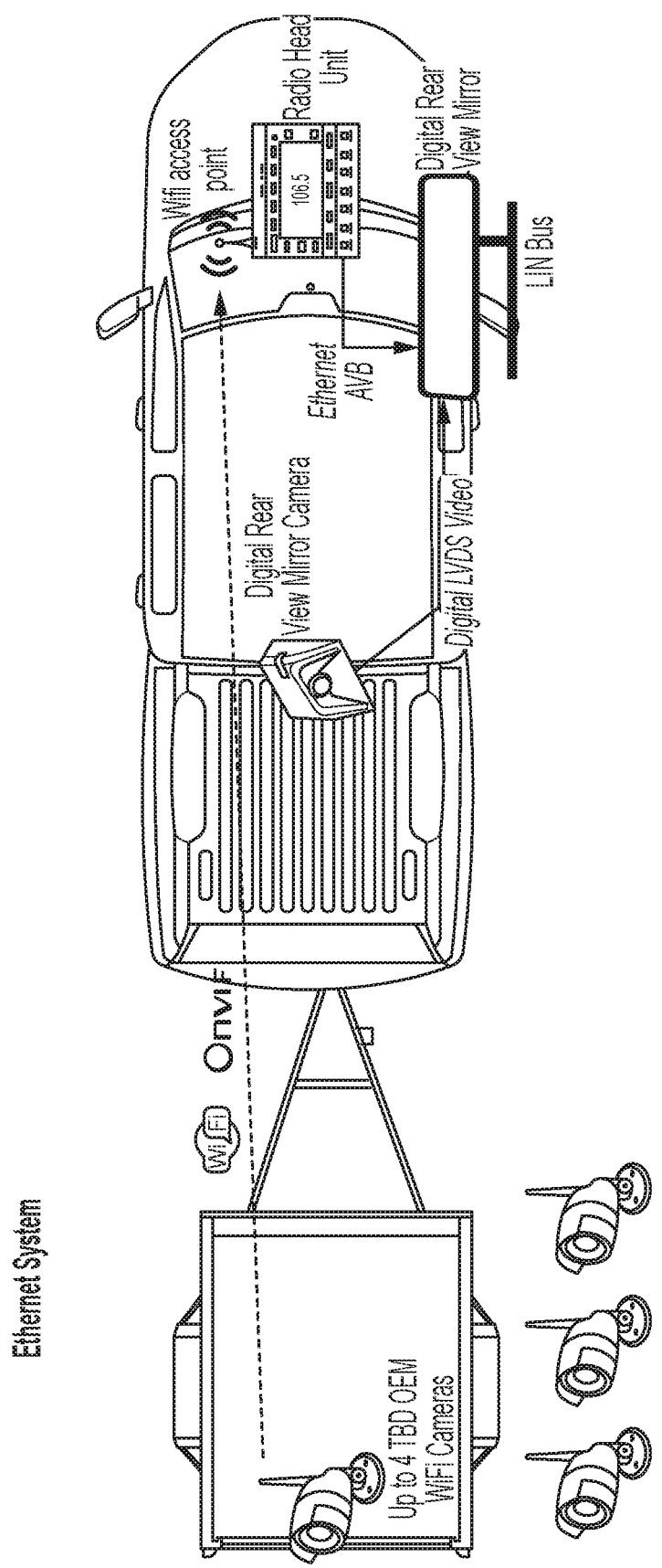
FIGS. 12 and 13 are schematics showing the mirror display in connection with a digital rear backup vehicle camera and wirelessly connected to a trailer camera.
Figure 13:
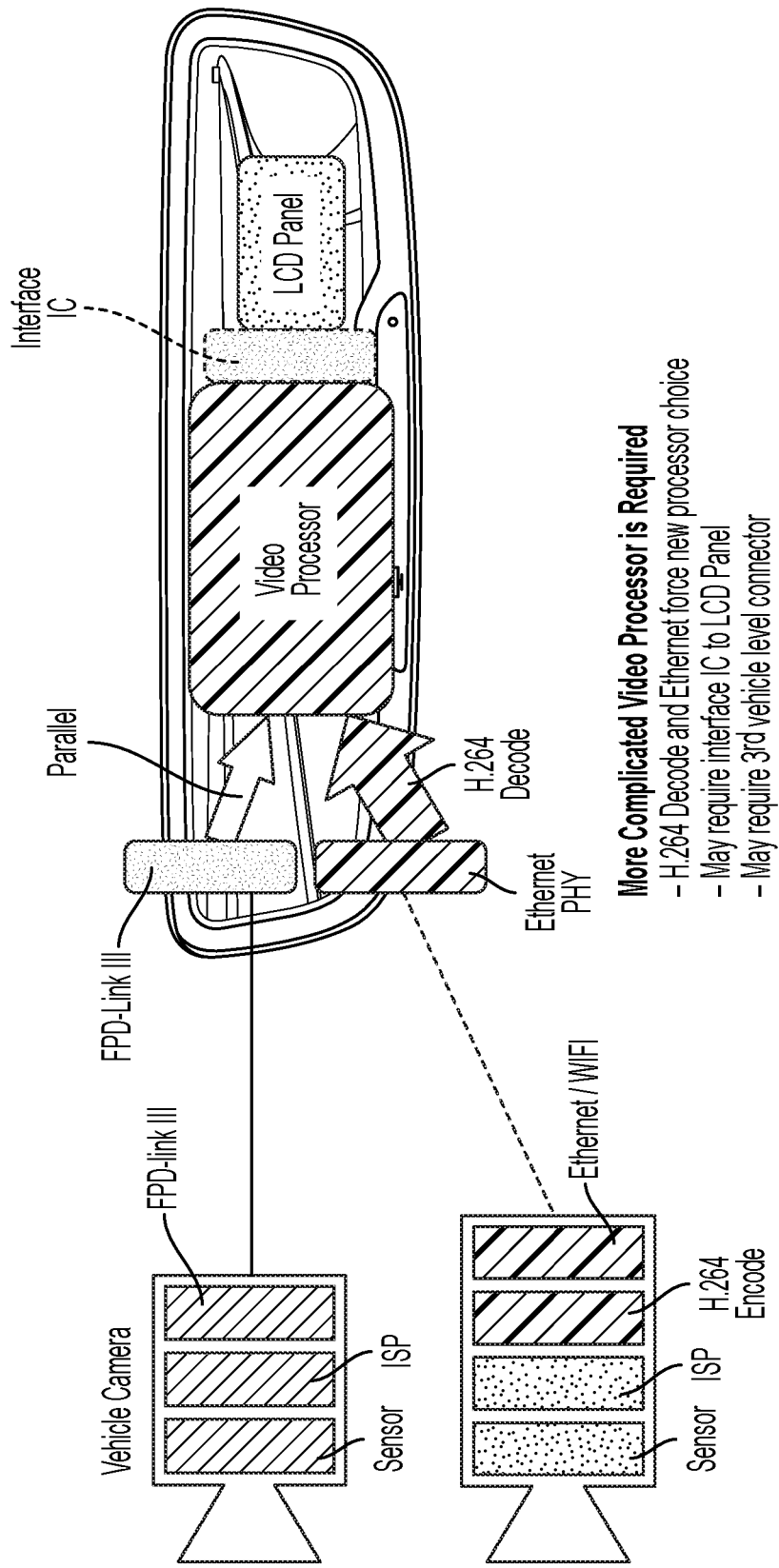

Optionally, and such as shown in FIGS. 12 and 13, the trailer may include one or more wireless cameras that may wirelessly communicate image data to a head unit of the vehicle for display of trailer camera video images at the mirror display. In such a system, the mirror or head unit may require a more complicated video processor to process the wireless signals from the trailer camera or the digital wired signals from the vehicle camera.

Thus, the display system of the present invention may provide for high definition or enhanced video display from a trailer mounted camera that may be located over 30 feet or over 60 feet or up to or over 90 feet from the display. For digital signals, cables or wires of such length would have attenuation in the signal such that the signal may not be suitable for a clear display of images. The system thus preferably decreases cable attenuation of the signal so that the desired signal strength can be provided from the trailer camera to the display without use of signal repeater modules (which would add expense and complexity to the system and would require an external power supply and a microprocessor for signal management). The system of the present invention provides a high definition (one MP or more) analog camera that outputs an analog NTSC signal to the display, and the display screen displays video images derived from the NTSC signal.

Figure 14:
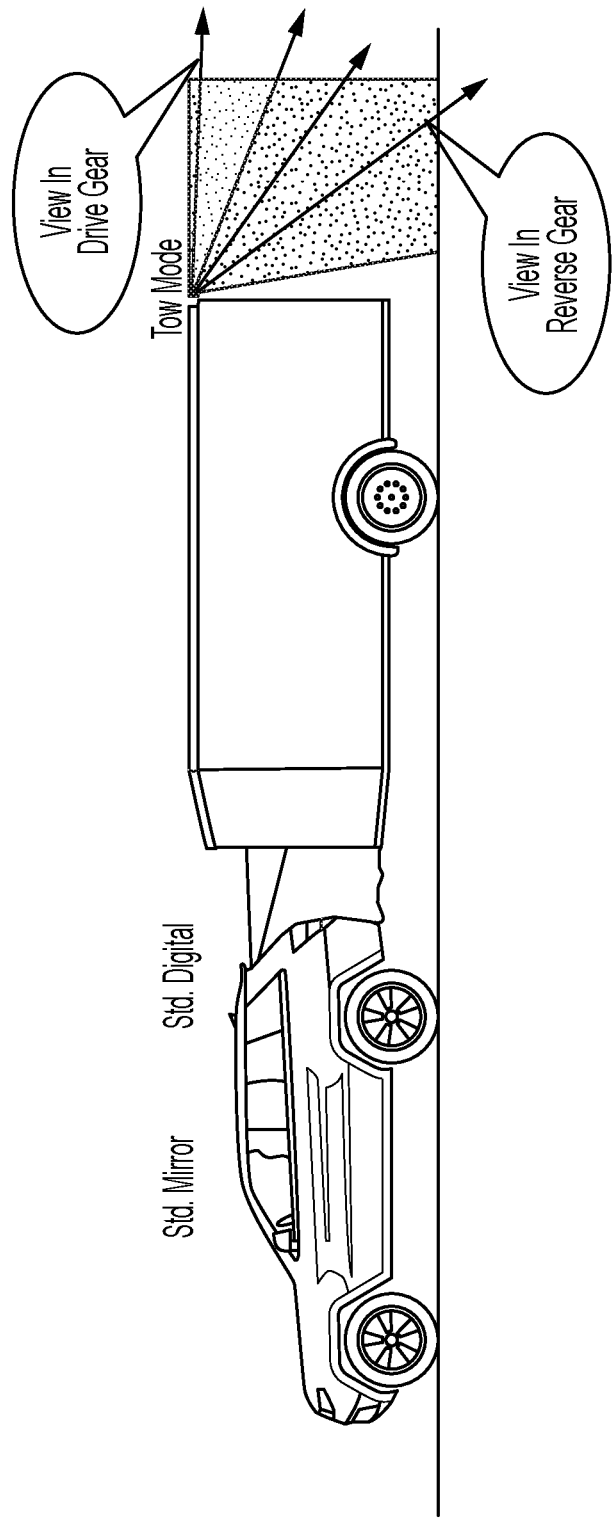
FIG. 14 is a side elevation of a vehicle and trailer with the camera and display system of the present invention, showing camera views utilized for displaying different views when the vehicle is driving forward and during reverse backup maneuvers.
Figure 15:
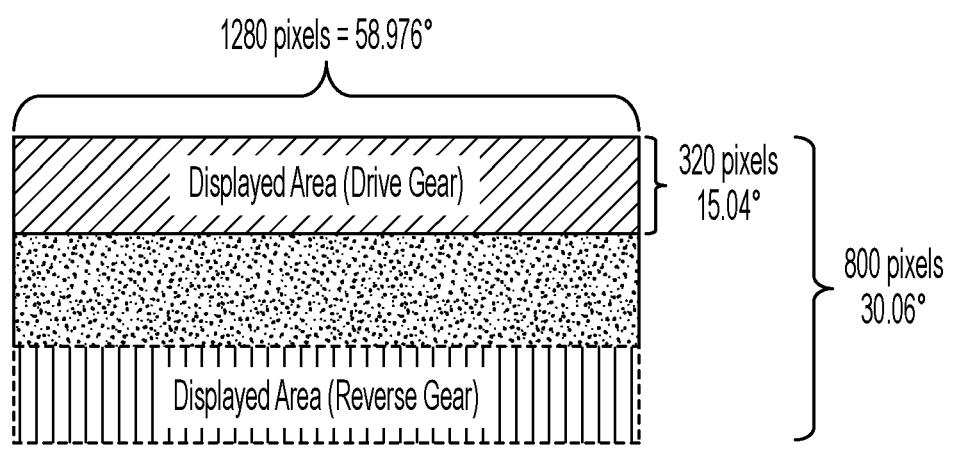
FIG. 15 is a schematic showing the regions of the image data captured by the trailer camera that are used for forward towing of the trailer and reversing of the vehicle and trailer.

Optionally, the system may display different views derived from image data captured by the trailer camera for different driving conditions or maneuvers. For example, and with reference to FIGS. 14 and 15, the trailer camera may have a field of view that is downward and rearward of the trailer. During a forward towing driving maneuver (with the trailer being hitched to the vehicle), the system may display only an upper region of the field of view of the trailer-mounted camera so as to provide a rearward field of view to the driver that would be similar to the rearview mirror view (if the trailer were not attached). During a reversing trailering maneuver (with the trailer hitched to the vehicle), it is desirable to see the ground area close to or immediately rearward of the trailer, and thus the system may display a lower region of the field of view of the trailer-mounted camera so as to provide a rearward field of view to the driver that would be similar to a rear backup camera of the vehicle (if the trailer were not attached). The system may automatically display the appropriate region, such as responsive to the vehicle being shifted into a forward or drive gear (whereby the upper region is displayed) and responsive to the vehicle being shifted into a reverse gear (whereby the lower region is displayed). Optionally, the system may display the full field of view, such as responsive to a user input or the like.

The images displayed may be derived from image data captured by the rearward viewing camera of the vehicle, such as a rear backup camera or a trailer mounted camera, and may provide the field of view similar to what is provided by the mirror reflector when the mirror is in its mirror mode (such as by utilizing aspects of the systems described in International Publication No. WO 2017/191558, which is hereby incorporated herein by reference in its entirety). The camera may comprise a rear backup camera or may comprise one or more rearward viewing cameras disposed at an exterior rearview mirror of the vehicle, such as by utilizing aspects of the systems described in U.S. Pat. Nos. 9,676,336 and/or 9,487,142, which are hereby incorporated herein by reference in their entireties. The camera may be disposed at the rear of the vehicle, or may be a side-mounted camera (such as at a side exterior rearview mirror assembly) and may be extendable to provide an enhanced rearward field of view, such as by utilizing aspects of the mirrors and cameras described in U.S. Pat. Nos. 9,676,336 and/or 9,487,142, which are hereby incorporated herein by reference in their entireties.

Optionally, the display may utilize aspects of the displays of the types disclosed in U.S. Pat. Nos. 5,530,240 and/or 6,329,925, which are hereby incorporated herein by reference in their entireties, and/or of display-on-demand or transflective type displays, such as the types disclosed in U.S. Pat. Nos. 7,855,755; 7,777,611; 7,626,749; 7,581,859; 7,446,924; 7,446,650; 7,370,983; 7,338,177; 7,274,501; 7,255,451; 7,195,381; 7,184,190; 6,690,268; 5,668,663 and/or 5,724,187, and/or in U.S. Publication No. US-2006-0050018, and/or International Publication No. WO 2004/058540, which are all hereby incorporated herein by reference in their entireties. The display may be viewable through the reflective element when the display is activated to display information.

Changes and modifications to the specifically described embodiments may be carried out without departing from the principles of the present invention, which is intended to be limited only by the scope of the appended claims as interpreted according to the principles of patent law.

The invention claimed is:

1. A vehicular video mirror system, the vehicular video mirror system comprising:

an interior rearview mirror assembly comprising a mirror head adjustable about a mounting base;

wherein the mounting base is configured for mounting the interior rearview mirror assembly at an interior portion of a vehicle equipped with the vehicular video mirror system;

wherein the mirror head accommodates a transflective mirror reflective element, and wherein the transflective mirror reflective element comprises a transflective mirror reflector;

a display device comprising a video display screen accommodated by the mirror head;

wherein the video display screen is disposed behind the transflective mirror reflector of the transflective mirror reflective element;

wherein, with the interior rearview mirror assembly mounted at the interior portion of the vehicle, the vehicular video mirror system is operable in a mirror mode or a display mode, and wherein, when the vehicular video mirror system operates in the mirror mode, the video display screen is not activated and the transflective mirror reflector of the transflective mirror reflective element provides a mirror-reflected rearward view for a driver of the vehicle, and wherein, when the vehicular video mirror system operates in the display mode, the video display screen is activated and displays video images that are viewable through the transflective mirror reflector of the transflective mirror reflective element by the driver of the vehicle when viewing the transflective mirror reflective element;

a vehicle-mounted rearward-viewing camera disposed at the vehicle and viewing at least rearward of the vehicle;

wherein the vehicle-mounted rearward-viewing camera comprises a digital camera;

wherein the vehicle-mounted rearward-viewing camera comprises an imaging array having at least two million photosensor elements arranged in rows and columns;

wherein image data captured by the vehicle-mounted rearward-viewing camera is carried from the vehicle-mounted rearward-viewing camera via a coaxial cable;

a trailer-mounted rearward-viewing camera disposed at a trailer that is configured to be hitched to the vehicle, the trailer-mounted rearward-viewing camera viewing at least rearward of the trailer;

wherein the trailer-mounted rearward-viewing camera comprises an analog camera;

wherein the trailer-mounted rearward-viewing camera comprises an imaging array having a plurality of photosensor elements arranged in rows and columns;

wherein, with no trailer hitched to the vehicle, and with the interior rearview mirror assembly mounted at the interior portion of the vehicle and when the vehicular video mirror system operates in the display mode, the video display screen displays video images derived from image data captured by the vehicle-mounted rearward-viewing camera;

wherein, with the trailer equipped with the trailer-mounted rearward-viewing camera hitched to the vehicle, and with the interior rearview mirror assembly mounted at the interior portion of the vehicle and when the vehicular video mirror system operates in the display mode, the video display screen displays rearward-view video images derived from image data captured by the trailer-mounted rearward-viewing camera; and wherein, with the interior rearview mirror assembly mounted at the interior portion of the vehicle, and responsive to actuation of a user input by the driver of the vehicle, the mirror head and the transflective mirror reflective element pivot together and in tandem between (i) a mirror mode orientation when the vehicular video mirror system operates in the mirror mode and (ii) a display mode orientation when the vehicular video mirror system operates in the display mode.

2. The vehicular video mirror system of claim 1, wherein, with the interior rearview mirror assembly mounted at the interior portion of the vehicle, the vehicular video mirror system operates in the display mode responsive to actuation of a user input by the driver of the vehicle.

3. The vehicular video mirror system of claim 1, wherein, with no trailer hitched to the vehicle, and with the interior rearview mirror assembly mounted at the interior portion of the vehicle and when the vehicular video mirror system operates in the display mode when the vehicle is moving forward, the video display screen displays video images derived from image data captured by the vehicle-mounted rearward-viewing camera.

4. The vehicular video mirror system of claim 1, wherein, with the interior rearview mirror assembly mounted at the interior portion of the vehicle, the vehicular video mirror system, responsive to determination of hitching to the vehicle of the trailer equipped with the trailer-mounted rearward-viewing camera, operates in the display mode and the video display screen displays video images derived from image data captured by the trailer-mounted rearward-viewing camera.

5. The vehicular video mirror system of claim 4, wherein the vehicular video mirror system determines hitching to the vehicle of the trailer equipped with the trailer-mounted rearward-viewing camera responsive to receipt of a wireless communication from the trailer-mounted rearward-viewing camera that is indicative of the trailer equipped with the trailer-mounted rearward-viewing camera being hitched to the vehicle.

6. The vehicular video mirror system of claim 1, wherein the display device is in wireless communication with the trailer-mounted rearward-viewing camera.

7. The vehicular video mirror system of claim 1, wherein, with the trailer equipped with the trailer-mounted rearward-viewing camera hitched to the vehicle, image data captured by the trailer-mounted rearward-viewing camera is carried to the vehicle via a cable.

8. The vehicular video mirror system of claim 7, wherein the cable comprises a shielded twisted pair cable.

9. A vehicular video mirror system, the vehicular video mirror system comprising:

an interior rearview mirror assembly comprising a mirror head adjustable about a mounting base;

wherein the mounting base is configured for mounting the interior rearview mirror assembly at an interior portion of a vehicle equipped with the vehicular video mirror system;

wherein the mirror head accommodates a transflective mirror reflective element, and wherein the transflective mirror reflective element comprises a transflective mirror reflector;

a display device comprising a video display screen accommodated by the mirror head;

wherein the video display screen is disposed behind the transflective mirror reflector of the transflective mirror reflective element;

wherein, with the interior rearview mirror assembly mounted at the interior portion of the vehicle, the vehicular video mirror system is operable in a mirror mode or a display mode, and wherein, when the vehicular video mirror system operates in the mirror mode, the video display screen is not activated and the transflective mirror reflector of the transflective mirror reflective element provides a mirror-reflected rearward view for a driver of the vehicle, and wherein, when the vehicular video mirror system operates in the display mode, the video display screen is activated and displays video images that are viewable through the transflective mirror reflector of the transflective mirror reflective element by the driver of the vehicle when viewing the transflective mirror reflective element;

a vehicle-mounted rearward-viewing camera disposed at the vehicle and viewing at least rearward of the vehicle;

wherein the vehicle-mounted rearward-viewing camera comprises a digital camera;

wherein the vehicle-mounted rearward-viewing camera comprises an imaging array having at least two million photosensor elements arranged in rows and columns;

wherein image data captured by the vehicle-mounted rearward-viewing camera is carried from the vehicle-mounted rearward-viewing camera via a coaxial cable;

a trailer-mounted rearward-viewing camera disposed at a trailer that is configured to be hitched to the vehicle, the trailer-mounted rearward-viewing camera viewing at least rearward of the trailer;

wherein the trailer-mounted rearward-viewing camera comprises an analog camera;

wherein the trailer-mounted rearward-viewing camera comprises an imaging array having a plurality of photosensor elements arranged in rows and columns;

wherein, with no trailer hitched to the vehicle, and with the interior rearview mirror assembly mounted at the interior portion of the vehicle and when the vehicular video mirror system operates in the display mode, the video display screen displays video images derived from image data captured by the vehicle-mounted rearward-viewing camera;

wherein, with the trailer equipped with the trailer-mounted rearward-viewing camera hitched to the vehicle, and with the interior rearview mirror assembly mounted at the interior portion of the vehicle and when the vehicular video mirror system operates in the display mode, the video display screen displays rearward-view video images derived from image data captured by the trailer-mounted rearward-viewing camera; and wherein, with the trailer equipped with the trailer-mounted rearward-viewing camera hitched to the vehicle, image data captured by the trailer-mounted rearward-viewing camera is carried to the vehicle utilizing Low Voltage Differential Signaling (LVDS).

10. The vehicular video mirror system of claim 1, wherein the vehicle-mounted rearward-viewing camera captures frames of image data at a frame rate that is greater than 30 frames per second.

11. The vehicular video mirror system of claim 1, wherein the trailer-mounted rearward-viewing camera captures frames of image data at a frame rate that is greater than 30 frames per second.

12. The vehicular video mirror system of claim 1, wherein the vehicle-mounted rearward-viewing camera captures frames of image data at a frame rate of at least 60 frames per second.

13. The vehicular video mirror system of claim 1, wherein the trailer-mounted rearward-viewing camera captures frames of image data at a frame rate of at least 60 frames per second.

14. The vehicular video mirror system of claim 1, wherein the interior portion of the vehicle comprises an in-cabin surface of a windshield of the vehicle.

15. A vehicular video mirror system, the vehicular video mirror system comprising:

an interior rearview mirror assembly comprising a mirror head adjustable about a mounting base;

wherein the mounting base is configured for mounting the interior rearview mirror assembly at an interior portion of a vehicle equipped with the vehicular video mirror system;

wherein the mirror head accommodates a transflective mirror reflective element, and wherein the transflective mirror reflective element comprises a transflective mirror reflector;

a display device comprising a video display screen accommodated by the mirror head;

wherein the video display screen is disposed behind the transflective mirror reflector of the transflective mirror reflective element;

wherein, with the interior rearview mirror assembly mounted at the interior portion of the vehicle, the vehicular video mirror system is operable in a mirror mode or a display mode, and wherein, when the vehicular video mirror system operates in the mirror mode, the video display screen is not activated and the transflective mirror reflector of the transflective mirror reflective element provides a mirror-reflected rearward view for a driver of the vehicle, and wherein, when the vehicular video mirror system operates in the display mode, the video display screen is activated and displays video images that are viewable through the transflective mirror reflector of the transflective mirror reflective element by the driver of the vehicle when viewing the transflective mirror reflective element;

a vehicle-mounted rearward-viewing camera disposed at the vehicle and viewing at least rearward of the vehicle;

wherein the vehicle-mounted rearward-viewing camera comprises a digital camera;

wherein the vehicle-mounted rearward-viewing camera comprises an imaging array having at least two million photosensor elements arranged in rows and columns;

wherein image data captured by the vehicle-mounted rearward-viewing camera is carried from the vehicle-mounted rearward-viewing camera via a coaxial cable;

a trailer-mounted rearward-viewing camera disposed at a trailer that is configured to be hitched to the vehicle, the trailer-mounted rearward-viewing camera viewing at least rearward of the trailer;

wherein the trailer-mounted rearward-viewing camera comprises an analog camera;

wherein the trailer-mounted rearward-viewing camera comprises an imaging array having a plurality of photosensor elements arranged in rows and columns;

wherein, with no trailer hitched to the vehicle, and with the interior rearview mirror assembly mounted at the interior portion of the vehicle and when the vehicular video mirror system operates in the display mode, the video display screen displays video images derived from image data captured by the vehicle-mounted rearward-viewing camera;

wherein, with the trailer equipped with the trailer-mounted rearward-viewing camera hitched to the vehicle, and with the interior rearview mirror assembly mounted at the interior portion of the vehicle and when the vehicular video mirror system operates in the display mode, the video display screen displays rearward-view video images derived from image data captured by the trailer-mounted rearward-viewing camera; and wherein the plurality of photosensor elements of the imaging array of the trailer-mounted rearward-viewing camera comprises at least (i) a first subset of photosensor elements and (ii) a second subset of photosensor elements that is different from the first subset of photosensor elements, and wherein the first subset of photosensor elements captures image data representative of an upper rearward-view region of a field of view of the trailer-mounted rearward-viewing camera, and wherein the second subset of photosensor elements of the plurality of photosensor elements captures image data representative of a lower rearward-view region of the field of view of the trailer-mounted rearward-viewing camera, and wherein, with the trailer equipped with the trailer-mounted rearward-viewing camera hitched to the vehicle, and with the interior rearview mirror assembly mounted at the interior portion of the vehicle and when the vehicular video mirror system operates in the display mode, the video display screen displays rearward-view video images derived from image data captured by the first subset of photosensor elements of the trailer-mounted rearward-viewing camera and does not display video images derived from image data captured by the second subset of photosensor elements of the trailer-mounted rearward-viewing camera.

16. The vehicular video mirror system of claim 15, wherein the video display screen, with the trailer equipped with the trailer-mounted rearward-viewing camera hitched to the vehicle, and with the interior rearview mirror assembly mounted at the interior portion of the vehicle and when the vehicle is reversing, displays rearward-view video images derived from image data captured by the second subset of photosensor elements of the trailer-mounted rearward-viewing camera and does not display video images derived from image data captured by the first subset of photosensor elements of the trailer-mounted rearward-viewing camera.

17. The vehicular video mirror system of claim 15, wherein the first subset of photosensor elements comprises forty percent of the plurality of photosensor elements, and wherein the second subset of photosensor elements comprises a different forty percent of the plurality of photosensor elements.

18. The vehicular video mirror system of claim 15, wherein the upper rearward-view region of the field of view of the trailer-mounted rearward-viewing camera does not overlap the lower rearward-view region of the field of view of the trailer-mounted rearward-viewing camera.

19. The vehicular video mirror system of claim 15, wherein, with the interior rearview mirror assembly mounted at the interior portion of the vehicle, and responsive to actuation of a user input by the driver of the vehicle, the video display screen simultaneously displays rearward-view video images derived from image data captured by (i) the first subset of photosensor elements of the plurality of photosensor elements of the imaging array of the trailer-mounted rearward-viewing camera and (ii) the second subset of photosensor elements of the plurality of photosensor elements of the imaging array of the trailer-mounted rearward-viewing camera.

20. The vehicular video mirror system of claim 15, wherein the plurality of photosensor elements of the imaging array of the trailer-mounted rearward-viewing camera comprises a third subset of photosensor elements disposed at least in part between the first subset of photosensor elements and the second subset of photosensor elements.

21. The vehicular video mirror system of claim 20, wherein, with the interior rearview mirror assembly mounted at the interior portion of the vehicle, and responsive to actuation of a user input by the driver of the vehicle, the video display screen simultaneously displays rearward-view video images derived from image data captured by (i) the first subset of photosensor elements of the plurality of photosensor elements of the imaging array of the trailer-mounted rearward-viewing camera, (ii) the second subset of photosensor elements of the plurality of photosensor elements of the imaging array of the trailer-mounted rearward-viewing camera and (iii) the third subset of photosensor elements of the plurality of photosensor elements of the imaging array of the trailer-mounted rearward-viewing camera.

22. The vehicular video mirror system of claim 1, wherein the video display screen has a resolution of at least 1280× 320 pixels.

23. The vehicular video mirror system of claim 1, wherein the resolution of the video display screen is at least 1600× 320 pixels.

24. A vehicular video mirror system, the vehicular video mirror system comprising:
an interior rearview mirror assembly comprising a mirror head adjustable about a mounting base;
wherein the mounting base is configured for mounting the interior rearview mirror assembly at an interior portion of a vehicle equipped with the vehicular video mirror system;
wherein the mirror head accommodates a transflective mirror reflective element, and wherein the transflective mirror reflective element comprises a transflective mirror reflector;
a display device comprising a video display screen accommodated by the mirror head;
wherein the video display screen is disposed behind the transflective mirror reflector of the transflective mirror reflective element;
wherein, with the interior rearview mirror assembly mounted at the interior portion of the vehicle, the vehicular video mirror system is operable in a mirror mode or a display mode, and wherein, when the vehicular video mirror system operates in the mirror mode, the video display screen is not activated and the transflective mirror reflector of the transflective mirror reflective element provides a mirror-reflected rearward view for a driver of the vehicle, and wherein, when the vehicular video mirror system operates in the display mode, the video display screen is activated and displays video images that are viewable through the transflective mirror reflector of the transflective mirror reflective element by the driver of the vehicle when viewing the transflective mirror reflective element;
a vehicle-mounted rearward-viewing camera disposed at the vehicle and viewing at least rearward of the vehicle;
wherein the vehicle-mounted rearward-viewing camera comprises a digital camera;
wherein the vehicle-mounted rearward-viewing camera comprises an imaging array having at least two million photosensor elements arranged in rows and columns;
wherein the vehicle-mounted rearward-viewing camera captures frames of image data at a frame rate that is greater than 30 frames per second;
wherein image data captured by the vehicle-mounted rearward-viewing camera is carried from the vehicle-mounted rearward-viewing camera via a coaxial cable;
a trailer-mounted rearward-viewing camera disposed at a trailer that is configured to be hitched to the vehicle, the trailer-mounted rearward-viewing camera viewing at least rearward of the trailer;
wherein the trailer-mounted rearward-viewing camera comprises an analog camera;
wherein the trailer-mounted rearward-viewing camera comprises an imaging array having a plurality of photosensor elements arranged in rows and columns;
wherein, with the trailer equipped with the trailer-mounted rearward-viewing camera hitched to the vehicle, image data captured by the trailer-mounted rearward-viewing camera is carried to the vehicle via a cable;
wherein the trailer-mounted rearward-viewing camera captures frames of image data at a frame rate that is greater than 30 frames per second;
wherein, with no trailer hitched to the vehicle, and with the interior rearview mirror assembly mounted at the interior portion of the vehicle and when the vehicular video mirror system operates in the display mode, the video display screen displays video images derived from image data captured by the vehicle-mounted rearward-viewing camera;
wherein, with the trailer equipped with the trailer-mounted rearward-viewing camera hitched to the vehicle, and with the interior rearview mirror assembly mounted at the interior portion of the vehicle and when the vehicular video mirror system operates in the display mode, the video display screen displays rearward-view video images derived from image data captured by the trailer-mounted rearward-viewing camera; and
wherein, with the trailer equipped with the trailer-mounted rearward-viewing camera hitched to the vehicle, image data captured by the trailer-mounted rearward-viewing camera is carried to the vehicle utilizing Low Voltage Differential Signaling (LVDS).

25. The vehicular video mirror system of claim 24, wherein, with the interior rearview mirror assembly mounted at the interior portion of the vehicle, the vehicular video mirror system operates in the display mode responsive to actuation of a user input by the driver of the vehicle.

26. The vehicular video mirror system of claim 24, wherein, with no trailer hitched to the vehicle, and with the interior rearview mirror assembly mounted at the interior portion of the vehicle and when the vehicular video mirror system operates in the display mode when the vehicle is moving forward, the video display screen displays video images derived from image data captured by the vehicle-mounted rearward-viewing camera.

27. The vehicular video mirror system of claim 24, wherein, with the interior rearview mirror assembly mounted at the interior portion of the vehicle, the vehicular video mirror system, responsive to determination of hitching to the vehicle of the trailer equipped with the trailer-mounted rearward-viewing camera, operates in the display mode and the video display screen displays video images derived from image data captured by the trailer-mounted rearward-viewing camera.

28. The vehicular video mirror system of claim 24, wherein the cable comprises a shielded twisted pair cable.

29. A vehicular video mirror system, the vehicular video mirror system comprising:
   an interior rearview mirror assembly comprising a mirror head adjustable about a mounting base;
   wherein the mounting base is configured for mounting the interior rearview mirror assembly at an interior portion of a vehicle equipped with the vehicular video mirror system;
   wherein the mirror head accommodates a transflective mirror reflective element, and wherein the transflective mirror reflective element comprises a transflective mirror reflector;
   a display device comprising a video display screen accommodated by the mirror head;
   wherein the video display screen is disposed behind the transflective mirror reflector of the transflective mirror reflective element;
   wherein, with the interior rearview mirror assembly mounted at the interior portion of the vehicle, the vehicular video mirror system is operable in a mirror mode or a display mode, and wherein, when the vehicular video mirror system operates in the mirror mode, the video display screen is not activated and the transflective mirror reflector of the transflective mirror reflective element provides a mirror-reflected rearward view for a driver of the vehicle, and wherein, when the vehicular video mirror system operates in the display mode, the video display screen is activated and displays video images that are viewable through the transflective mirror reflector of the transflective mirror reflective element by the driver of the vehicle when viewing the transflective mirror reflective element;
   a vehicle-mounted rearward-viewing camera disposed at the vehicle and viewing at least rearward of the vehicle;
   wherein the vehicle-mounted rearward-viewing camera comprises a digital camera;
   wherein the vehicle-mounted rearward-viewing camera comprises an imaging array having at least two million photosensor elements arranged in rows and columns;
   wherein the vehicle-mounted rearward-viewing camera captures frames of image data at a frame rate that is greater than 30 frames per second;
   wherein image data captured by the vehicle-mounted rearward-viewing camera is carried from the vehicle-mounted rearward-viewing camera via a coaxial cable;
   a trailer-mounted rearward-viewing camera disposed at a trailer that is configured to be hitched to the vehicle, the trailer-mounted rearward-viewing camera viewing at least rearward of the trailer;
   wherein the trailer-mounted rearward-viewing camera comprises an analog camera;
   wherein the trailer-mounted rearward-viewing camera comprises an imaging array having a plurality of photosensor elements arranged in rows and columns;
   wherein, with the trailer equipped with the trailer-mounted rearward-viewing camera hitched to the vehicle, image data captured by the trailer-mounted rearward-viewing camera is carried to the vehicle via a cable;
   wherein the trailer-mounted rearward-viewing camera captures frames of image data at a frame rate that is greater than 30 frames per second;
   wherein, with no trailer hitched to the vehicle, and with the interior rearview mirror assembly mounted at the interior portion of the vehicle and when the vehicular video mirror system operates in the display mode, the video display screen displays video images derived from image data captured by the vehicle-mounted rearward-viewing camera; and
   wherein, with the trailer equipped with the trailer-mounted rearward-viewing camera hitched to the vehicle, and with the interior rearview mirror assembly mounted at the interior portion of the vehicle and when the vehicular video mirror system operates in the display mode, the video display screen displays rearward-view video images derived from image data captured by the trailer-mounted rearward-viewing camera; and
   wherein, with the interior rearview mirror assembly mounted at the interior portion of the vehicle, and responsive to actuation of a user input by the driver of the vehicle, the mirror head and the transflective mirror reflective element pivot together and in tandem between (i) a mirror mode orientation when the vehicular video mirror system operates in the mirror mode and (ii) a display mode orientation when the vehicular video mirror system operates in the display mode.

30. The vehicular video mirror system of claim 24, wherein the vehicle-mounted rearward-viewing camera captures frames of image data at a frame rate of at least 60 frames per second.

31. The vehicular video mirror system of claim 24, wherein the trailer-mounted rearward-viewing camera captures frames of image data at a frame rate of at least 60 frames per second.

32. A vehicular video mirror system, the vehicular video mirror system comprising:
   an interior rearview mirror assembly comprising a mirror head adjustable about a mounting base;
   wherein the mounting base is configured for mounting the interior rearview mirror assembly at an interior portion of a vehicle equipped with the vehicular video mirror system;
   wherein the mirror head accommodates a transflective mirror reflective element, and wherein the transflective mirror reflective element comprises a transflective mirror reflector;
   a display device comprising a video display screen accommodated by the mirror head;
   wherein the video display screen is disposed behind the transflective mirror reflector of the transflective mirror reflective element;
   wherein, with the interior rearview mirror assembly mounted at the interior portion of the vehicle, the vehicular video mirror system is operable in a mirror mode or a display mode, and wherein, when the vehicular video mirror system operates in the mirror mode, the video display screen is not activated and the transflective mirror reflector of the transflective mirror reflective element provides a mirror-reflected rearward view for a driver of the vehicle, and wherein, when the vehicular video mirror system operates in the display mode, the video display screen is activated and displays video images that are viewable through the transflective mirror reflector of the transflective mirror reflective element by the driver of the vehicle when viewing the transflective mirror reflective element;

a vehicle-mounted rearward-viewing camera disposed at the vehicle and viewing at least rearward of the vehicle;

wherein the vehicle-mounted rearward-viewing camera comprises a digital camera;

wherein the vehicle-mounted rearward-viewing camera comprises an imaging array having at least two million photosensor elements arranged in rows and columns;

wherein the vehicle-mounted rearward-viewing camera captures frames of image data at a frame rate that is greater than 30 frames per second;

wherein image data captured by the vehicle-mounted rearward-viewing camera is carried from the vehicle-mounted rearward-viewing camera via a coaxial cable;

a trailer-mounted rearward-viewing camera disposed at a trailer that is configured to be hitched to the vehicle, the trailer-mounted rearward-viewing camera viewing at least rearward of the trailer;

wherein the trailer-mounted rearward-viewing camera comprises an analog camera;

wherein the trailer-mounted rearward-viewing camera comprises an imaging array having a plurality of photosensor elements arranged in rows and columns;

wherein, with the trailer equipped with the trailer-mounted rearward-viewing camera hitched to the vehicle, image data captured by the trailer-mounted rearward-viewing camera is carried to the vehicle via a cable;

wherein the trailer-mounted rearward-viewing camera captures frames of image data at a frame rate that is greater than 30 frames per second;

wherein, with no trailer hitched to the vehicle, and with the interior rearview mirror assembly mounted at the interior portion of the vehicle and when the vehicular video mirror system operates in the display mode, the video display screen displays video images derived from image data captured by the vehicle-mounted rearward-viewing camera;

wherein, with the trailer equipped with the trailer-mounted rearward-viewing camera hitched to the vehicle, and with the interior rearview mirror assembly mounted at the interior portion of the vehicle and when the vehicular video mirror system operates in the display mode, the video display screen displays rearward-view video images derived from image data captured by the trailer-mounted rearward-viewing camera; and wherein the plurality of photosensor elements of the imaging array of the trailer-mounted rearward-viewing camera comprises at least (i) a first subset of photosensor elements and (ii) a second subset of photosensor elements that is different from the first subset of photosensor elements, and wherein the first subset of photosensor elements captures image data representative of an upper rearward-view region of a field of view of the trailer-mounted rearward-viewing camera, and wherein the second subset of photosensor elements of the plurality of photosensor elements captures image data representative of a lower rearward-view region of the field of view of the trailer-mounted rearward-viewing camera, and wherein, with the trailer equipped with the trailer-mounted rearward-viewing camera hitched to the vehicle, and with the interior rearview mirror assembly mounted at the interior portion of the vehicle and when the vehicular video mirror system operates in the display mode, the video display screen displays rearward-view video images derived from image data captured by the first subset of photosensor elements of the trailer-mounted rearward-viewing camera and does not display video images derived from image data captured by the second subset of photosensor elements of the trailer-mounted rearward-viewing camera.

33. The vehicular video mirror system of claim 32, wherein the video display screen, with the trailer equipped with the trailer-mounted rearward-viewing camera hitched to the vehicle, and with the interior rearview mirror assembly mounted at the interior portion of the vehicle and when the vehicle is reversing, displays rearward-view video images derived from image data captured by the second subset of photosensor elements of the trailer-mounted rearward-viewing camera and does not display video images derived from image data captured by the first subset of photosensor elements of the trailer-mounted rearward-viewing camera.

34. The vehicular video mirror system of claim 24, wherein the video display screen has a resolution of at least 1280×320 pixels.

35. The vehicular video mirror system of claim 24, wherein the resolution of the video display screen is at least 1600×320 pixels.

36. A vehicular video mirror system, the vehicular video mirror system comprising:

an interior rearview mirror assembly comprising a mirror head adjustable about a mounting base;

wherein the mounting base is configured for mounting the interior rearview mirror assembly at an interior portion of a vehicle equipped with the vehicular video mirror system;

wherein the mirror head accommodates a transflective mirror reflective element, and wherein the transflective mirror reflective element comprises a transflective mirror reflector;

a display device comprising a video display screen accommodated by the mirror head;

wherein the video display screen is disposed behind the transflective mirror reflector of the transflective mirror reflective element;

wherein the video display screen has a resolution of at least 1280×320 pixels;

wherein, with the interior rearview mirror assembly mounted at the interior portion of the vehicle, the vehicular video mirror system is operable in a mirror mode or a display mode responsive to actuation of a user input by a driver of the vehicle, and wherein, when the vehicular video mirror system operates in the mirror mode, the video display screen is not activated and the transflective mirror reflector of the transflective mirror reflective element provides a mirror-reflected rearward view for the driver of the vehicle, and wherein, when the vehicular video mirror system operates in the display mode, the video display screen is activated and displays video images that are viewable through the transflective mirror reflector of the transflective mirror reflective element by the driver of the vehicle when viewing the transflective mirror reflective element;

wherein, with the interior rearview mirror assembly mounted at the interior portion of the vehicle, and responsive to actuation of the user input by the driver of the vehicle, the mirror head and the transflective mirror reflective element pivot together and in tandem between (i) a mirror mode orientation when the vehicular video mirror system operates in the mirror mode and (ii) a display mode orientation when the vehicular video mirror system operates in the display mode;
a vehicle-mounted rearward-viewing camera disposed at the vehicle and viewing at least rearward of the vehicle;
wherein the vehicle-mounted rearward-viewing camera comprises a digital camera;
wherein the vehicle-mounted rearward-viewing camera comprises an imaging array having at least two million photosensor elements arranged in rows and columns;
wherein the vehicle-mounted rearward-viewing camera captures frames of image data at a frame rate that is greater than 30 frames per second;
wherein image data captured by the vehicle-mounted rearward-viewing camera is carried from the vehicle-mounted rearward-viewing camera via a coaxial cable;
a trailer-mounted rearward-viewing camera disposed at a trailer that is configured to be hitched to the vehicle, the trailer-mounted rearward-viewing camera viewing at least rearward of the trailer;
wherein the trailer-mounted rearward-viewing camera comprises an analog camera;
wherein the trailer-mounted rearward-viewing camera comprises an imaging array having a plurality of photosensor elements arranged in rows and columns;
wherein the trailer-mounted rearward-viewing camera captures frames of image data at a frame rate that is greater than 30 frames per second;
wherein, with no trailer hitched to the vehicle, and with the interior rearview mirror assembly mounted at the interior portion of the vehicle and when the vehicular video mirror system operates in the display mode, the video display screen displays video images derived from image data captured by the vehicle-mounted rearward-viewing camera;
wherein, with the trailer equipped with the trailer-mounted rearward-viewing camera hitched to the vehicle, and when the vehicular video mirror system operates in the display mode, the video display screen displays rearward-view video images derived from image data captured by the trailer-mounted rearward-viewing camera; and
wherein, with the trailer equipped with the trailer-mounted rearward-viewing camera hitched to the vehicle, image data captured by the trailer-mounted rearward-viewing camera is carried to the vehicle utilizing Low Voltage Differential Signaling (LVDS).

37. The vehicular video mirror system of claim 36, wherein, with no trailer hitched to the vehicle, and with the interior rearview mirror assembly mounted at the interior portion of the vehicle and when the vehicular video mirror system operates in the display mode when the vehicle is moving forward, the video display screen displays video images derived from image data captured by the vehicle-mounted rearward-viewing camera.

38. The vehicular video mirror system of claim 36, wherein, with the interior rearview mirror assembly mounted at the interior portion of the vehicle, the vehicular video mirror system, responsive to determination of hitching to the vehicle of the trailer equipped with the trailer-mounted rearward-viewing camera, operates in the display mode and the video display screen displays video images derived from image data captured by the trailer-mounted rearward-viewing camera.

39. The vehicular video mirror system of claim 36, wherein, with the trailer equipped with the trailer-mounted rearward-viewing camera hitched to the vehicle, image data captured by the trailer-mounted rearward-viewing camera is carried to the vehicle via a cable.

40. The vehicular video mirror system of claim 39, wherein the cable comprises a shielded twisted pair cable.

41. The vehicular video mirror system of claim 36, wherein the vehicle-mounted rearward-viewing camera captures frames of image data at a frame rate of at least 60 frames per second.

42. The vehicular video mirror system of claim 36, wherein the trailer-mounted rearward-viewing camera captures frames of image data at a frame rate of at least 60 frames per second.

43. A vehicular video mirror system, the vehicular video mirror system comprising:
an interior rearview mirror assembly comprising a mirror head adjustable about a mounting base;
wherein the mounting base is configured for mounting the interior rearview mirror assembly at an interior portion of a vehicle equipped with the vehicular video mirror system;
wherein the mirror head accommodates a transflective mirror reflective element, and wherein the transflective mirror reflective element comprises a transflective mirror reflector;
a display device comprising a video display screen accommodated by the mirror head;
wherein the video display screen is disposed behind the transflective mirror reflector of the transflective mirror reflective element;
wherein the video display screen has a resolution of at least 1280×320 pixels;
wherein, with the interior rearview mirror assembly mounted at the interior portion of the vehicle, the vehicular video mirror system is operable in a mirror mode or a display mode responsive to actuation of a user input by a driver of the vehicle, and wherein, when the vehicular video mirror system operates in the mirror mode, the video display screen is not activated and the transflective mirror reflector of the transflective mirror reflective element provides a mirror-reflected rearward view for the driver of the vehicle, and wherein, when the vehicular video mirror system operates in the display mode, the video display screen is activated and displays video images that are viewable through the transflective mirror reflector of the transflective mirror reflective element by the driver of the vehicle when viewing the transflective mirror reflective element;
wherein, with the interior rearview mirror assembly mounted at the interior portion of the vehicle, and responsive to actuation of the user input by the driver of the vehicle, the mirror head and the transflective mirror reflective element pivot together and in tandem between (i) a mirror mode orientation when the vehicular video mirror system operates in the mirror mode and (ii) a display mode orientation when the vehicular video mirror system operates in the display mode;
a vehicle-mounted rearward-viewing camera disposed at the vehicle and viewing at least rearward of the vehicle;
wherein the vehicle-mounted rearward-viewing camera comprises a digital camera;
wherein the vehicle-mounted rearward-viewing camera comprises an imaging array having at least two million photosensor elements arranged in rows and columns;
wherein the vehicle-mounted rearward-viewing camera captures frames of image data at a frame rate that is greater than 30 frames per second;

wherein image data captured by the vehicle-mounted rearward-viewing camera is carried from the vehicle-mounted rearward-viewing camera via a coaxial cable;

a trailer-mounted rearward-viewing camera disposed at a trailer that is configured to be hitched to the vehicle, the trailer-mounted rearward-viewing camera viewing at least rearward of the trailer;

wherein the trailer-mounted rearward-viewing camera comprises an analog camera;

wherein the trailer-mounted rearward-viewing camera comprises an imaging array having a plurality of photosensor elements arranged in rows and columns;

wherein the trailer-mounted rearward-viewing camera captures frames of image data at a frame rate that is greater than 30 frames per second;

wherein, with no trailer hitched to the vehicle, and with the interior rearview mirror assembly mounted at the interior portion of the vehicle and when the vehicular video mirror system operates in the display mode, the video display screen displays video images derived from image data captured by the vehicle-mounted rearward-viewing camera;

wherein, with the trailer equipped with the trailer-mounted rearward-viewing camera hitched to the vehicle, and when the vehicular video mirror system operates in the display mode, the video display screen displays rearward-view video images derived from image data captured by the trailer-mounted rearward-viewing camera; and wherein the plurality of photosensor elements of the imaging array of the trailer-mounted rearward-viewing camera comprises at least (i) a first subset of photosensor elements and (ii) a second subset of photosensor elements that is different from the first subset of photosensor elements, and wherein the first subset of photosensor elements captures image data representative of an upper rearward-view region of a field of view of the trailer-mounted rearward-viewing camera, and wherein the second subset of photosensor elements of the plurality of photosensor elements captures image data representative of a lower rearward-view region of the field of view of the trailer-mounted rearward-viewing camera, and wherein, with the trailer equipped with the trailer-mounted rearward-viewing camera hitched to the vehicle, and with the interior rearview mirror assembly mounted at the interior portion of the vehicle and when the vehicular video mirror system operates in the display mode, the video display screen displays rearward-view video images derived from image data captured by the first subset of photosensor elements of the trailer-mounted rearward-viewing camera and does not display video images derived from image data captured by the second subset of photosensor elements of the trailer-mounted rearward-viewing camera.

44. The vehicular video mirror system of claim 43, wherein the video display screen, with the trailer equipped with the trailer-mounted rearward-viewing camera hitched to the vehicle, and with the interior rearview mirror assembly mounted at the interior portion of the vehicle and when the vehicle is reversing, displays rearward-view video images derived from image data captured by the second subset of photosensor elements of the trailer-mounted rearward-viewing camera and does not display video images derived from image data captured by the first subset of photosensor elements of the trailer-mounted rearward-viewing camera.

45. The vehicular video mirror system of claim 36, wherein the resolution of the video display screen is at least 1600×320 pixels.

* * * * *